United States Patent [19]

Injushin et al.

[11] 4,327,276

[45] Apr. 27, 1982

[54] WATER TREATMENT APPARATUS

[76] Inventors: Viktor M. Injushin, ulitsa Shevchenko, 162"D", kv. 18., Alma-Ata; Valentin I. Khokhlov, oblast, Kaskelensky raion, selo Kargalinka, ulitsa Kirova, 32, Alma-Atinskaya, both of U.S.S.R.; Fedor Akhremenko, deceased, late of Ust-Kamenogorsk, U.S.S.R.; by Galina T. Akhremenko, administrator, ulitsa Burova, 45, kv. 42, Ust-Kamenogorsk, U.S.S.R.

[21] Appl. No.: 125,251

[22] Filed: Feb. 27, 1980

[51] Int. Cl.³ .............................. B23K 27/00
[52] U.S. Cl. .................... 219/121 L; 250/432 R
[58] Field of Search ..... 219/121 L, 121 LM, 121 EB, 219/121 EM, 121 P, 121 PY; 422/22, 23, 24; 250/432 R

[56] References Cited

U.S. PATENT DOCUMENTS

| | | | |
|---|---|---|---|
| 3,767,545 | 10/1973 | Lucero | 204/155 |
| 3,817,703 | 6/1974 | Atwood | 250/432 R X |
| 3,926,556 | 12/1975 | Boucher | 422/24 X |
| 3,934,042 | 1/1976 | DeStoutz | 422/24 X |
| 4,051,005 | 9/1977 | Krascella | 204/157.1 R |
| 4,097,384 | 6/1978 | Coleman et al. | 250/527 |
| 4,102,645 | 7/1978 | Meacham, Jr. et al. | 422/24 X |

FOREIGN PATENT DOCUMENTS 340624  6/1972  U.S.S.R. .

*Primary Examiner*—C. L. Albritton
*Attorney, Agent, or Firm*—Robert E. Burns; Emmanuel J. Lobato; Bruce L. Adams

[57] ABSTRACT

A distinguishing feature of this invention consists in that a source of monochromatic light is located in the apparatus so that the axis thereof is aligned with a geometric center of an inlet port in a water line section, with said water line section made of transparent material. Inserted into a circuit of a coil and an electric power source is an electromagnet connected in series with said coil through a timer and mounting a screen seated on its core and serving for periodic interruption of a beam of light.

3 Claims, 1 Drawing Figure

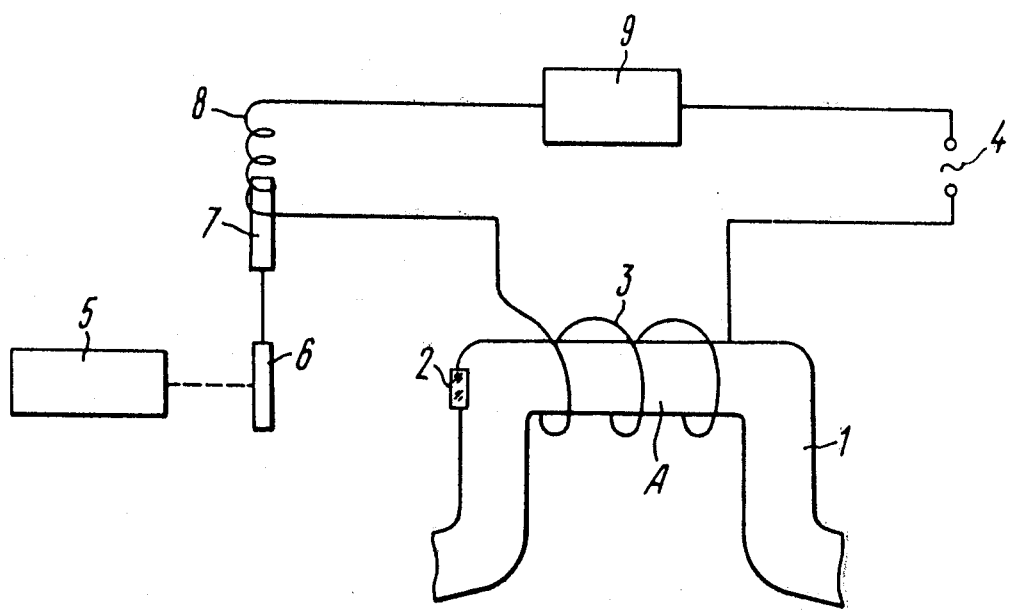

WATER TREATMENT APPARATUS

The present invention relates to the field of water treatment, and more particularly, to water treatment facilities.

The invention can most advantageously be used in various fields of agriculture and industry wherein water with stimulating properties is required as a solvent (for example, in medicine, biology, chemistry, food industry, etc.).

Known in the art are various physical and chemical methods of water treatment. In particular, diverse bactericidal, ultrasonic and magnetic source are applicable for water treatment.

A common component of water treatment devices is a water line and a source serving for exerting physical action on running water.

There is known an apparatus for ultraviolet water treatment. It comprises a quartz gas discharge tube designed for wide-spectrum radiation for treatment of water flowing through a water line at a definite rate.

Said prior-art apparatus is disadvantageous in that the quartz gas discharge tube emits radiation over a wide spectrum and does not provide for specific action on water molecular structure.

Consequently, water cannot be sufficiently activated and stable properties cannot be provided.

Also known in the art is an apparatus for ultrasonic water treatment. The apparatus comprises an oscillator which generates ultrasonic waves directed to water flowing at a definite rate through a water line. A disadvantage inherent of the foregoing apparatus is that the ultrasonic generation brings about collapse of molecular associations into discrete molecules detrimental to water molecular structure and, hence, to its activity.

There are also known a plurality of apparatuses wherein water is treated by a magnetic or electromagnetic field. An apparatus described in USSR Inventor's Certificate No. 340624, Cl. C02b comprises a water line mounting an electromagnetic coil connected to an electric power source. Activation of water is effected by applying an electromagnetic field.

A disadvantage of the foregoing apparatus consists in the low output thereof because water being activated must be repeatedly returned through the electromagnet operating area. Besides, water activity depends on content of antimagnetic admixtures in water whereas the effect of electromagnetic field is not selective.

The principal object of the present invention is to provide a source of light for water treatment and to arrange it in such a manner as to improve the water activation properties.

Another object of the invention is to increase the output of the apparatus as a whole.

It is preferable that a laser be used as a source of monochromatic light.

The nature of the present invention will be clear from the following description.

Water is supplied through a cylindrical water line at laminar conditions. Walls of the water line are manufactured from reflecting material, and an inlet end port is made of optical quartz to admit a coherent monochromatic beam of light through one section of the water line. To maintain the radiation parameters (such as coherence and energy flux density across the beam), the source of light is poitioned so that the axis thereof is aligned with a geometric center of said inlet port which is aligned with the axis of the section of the water line, with the diameter of the water line made equal to that of the beam of light.

The high monochromatic level and density of radiation at one or another wave length are favorable for the selective interaction of electrons of water molecules, ions with radiation. The selective interaction is improved by the use of an electromagnetic coil serving for induction of a constant or pulsed electromagnetic field. In the case of the pulsed field, the best efficiency is achieved when light and electromagnetic pulses are synchronous. The pulse energy is adjustable in the range from 20 mW to 30 kW according to the output of the apparatus.

The apparatus of the present invention can advantageously be used for various procedures where activated water is required to accelerate metabolic processes, as, for example, in the event of grain germination.

The invention will become more fully apparent from the following detailed description of a preferred embodiment thereof taken in conjunction with the accompanying drawing, which shows a water treatment apparatus according to the invention.

Referring now to FIG. 1, an apparatus comprises a water line 1 provided with an inlet port 2 made of optical quartz. The water line 1 passes a laminar water flow. An electromagnetic coil 3 mounted about the water line 1 is connected to an electric power source 4. The coil 3 induces an electromagnetic field in the water flowing through the water line 1. A source 5 of monochromatic light is arranged on a geometric center axis of the inlet port 2. It is possible that a laser be used as a source of monochromatic light.

Light radiated by the source intersects one section of the water line 1, wherefore the section A of the line is made of transparent material. A screen 6 located between the source 5 of light and the section A of the water line 1 periodically shuts off the beam of light. The screen 6 is attached to a core 7 of an electromagnet 8 series-connected to a circuit comprising the coil 3 and the power source 4 thereof. The electromagnet 8 is connected to the power source 4 of the coil 3 through a timer 9.

The apparatus operates as follows.

The water flow is directed through the water line 1 whereto the electromagnetic coil 3 is attached. The water flow is exposed both to the electromagnetic field and to monochromatic light radiated by the source 5, with the axis thereof passing through the geometric center of the inlet port 2 in the section of the water line 1. The section A of the water line 1 through which the beam of light passes is made of transparent material. While the water fow is exposed to radiation, the timer 9 switches on the power source of the coil 3 and lifts the screen 6 by pulling in the movable core 7 of the electromagnet 8. As a result, the beam of light reaches the section A of the water line 1. During the next operating cycle, the timer 9 disconnects the electric power source of the coil 3, whereby the screen 6 moves down and shuts off the beam radiated by the source 5 of monochromatic light. Hence, the apparatus according to the present invention operates under pulsed conditions.

Since pulses of monochromatic light are synchronous with electromagnetic oscillations, the resulting resonance improves the effect of radiation on the water flow.

Investigations have proved that it is possible to design an apparatus, wherein two sources of monochromatic light are axially aligned and directed in opposition to form a radiation zone. In this case, the use of the electromagnet in assembly with the screen is not expedient because the efficiency of such an apparatus is equivalent to that described hereinabove.

Thus, the apparatus of this invention provides for higher stability of the activation properties of water.

What is claimed is:

1. A water treatment apparatus, comprising: a water line; a circuit having a coil mounted about said water line and an electric power source connected thereto; an electromagnet in said circuit and a timer in series with said coil; one section of said water line provided with a light inlet port made of a transparent material; a source of monochromatic light having an axis thereof aligned with a geometric center of said inlet port in said water line section; and a screen mounted connected to be actuated by said electromagnet under control of said timer for periodic interruption of said beam radiated by said source of monochromatic light.

2. A water treatment apparatus as claimed in claim 1, wherein said source of monochromatic light is a laser.

3. A water treatment apparatus comprising; means for defining an enclosed flow path for a flow of water to be treated as the water flows, means defining a light-pervious port on the first mentioned means for allowing monochromatic light to flow therethrough along the flow path and through the flow of water as it flows, a source of monochromatic light for applying monochromatic light through said port to the water, a coil disposed for developing an electromagnetic field in said first-mentioned means so that said flow of water flows through said field, means for periodically energizing said coil and deenergizing it and simultaneously controlling application of said monochromatic light to said flow of water during intervals of energization of said coil.

* * * * *